(12) United States Patent
Yu et al.

(10) Patent No.: US 6,611,289 B1
(45) Date of Patent: Aug. 26, 2003

(54) DIGITAL CAMERAS USING MULTIPLE SENSORS WITH MULTIPLE LENSES

(76) Inventors: Yanbin Yu, 1965 Una Ct., Fremont, CA (US) 94539; Zhongxuan Zhang, 44453 Cavisson Ct., Fremont, CA (US) 94539

( * ) Notice: Subject to any disclaimer, the term of this patent is extended or adjusted under 35 U.S.C. 154(b) by 0 days.

(21) Appl. No.: 09/232,769

(22) Filed: Jan. 15, 1999

(51) Int. Cl.$^7$ ................ H04N 9/093; H04N 9/009
(52) U.S. Cl. ................ 348/265; 348/272; 348/279
(58) Field of Search ................ 348/272, 279, 348/265; H04N 9/090, 9/093

(56) References Cited

U.S. PATENT DOCUMENTS

| | | | |
|---|---|---|---|
| 3,971,065 A | | 7/1976 | Bayer |
| 4,506,294 A | * | 3/1985 | Nagumo ............... 358/50 |
| 5,081,525 A | * | 1/1992 | Akiyama ............... 358/51 |
| 5,414,465 A | * | 5/1995 | Kodama et al. .......... 348/264 |
| 5,436,661 A | * | 7/1995 | Yamamoto et al. ....... 348/263 |
| 5,726,707 A | | 3/1998 | Sakurai et al. |
| 6,021,172 A | * | 2/2000 | Fossum ................ 377/60 |

FOREIGN PATENT DOCUMENTS

| | | | | |
|---|---|---|---|---|
| JP | 06-351029 | * | 12/1994 | ...... H04N/9/09 |
| JP | 2000-050295 | * | 2/2000 | ...... H04N/9/093 |

* cited by examiner

*Primary Examiner*—Wendy R. Garber
*Assistant Examiner*—Catherine Toppin
(74) *Attorney, Agent, or Firm*—Joe Zheng (57) ABSTRACT

An improved digital camera that produces digital images of high qualities without using expensive image sensors and optics is disclosed. The disclosed digital cameras use multiple image sensors with multiple lenses. One of the multiple image sensors is made to be responsive to all intensity information in visible color spectrum and a (gray intensity) image resulting from the sensor is used to compensate lost information in images from other image sensors responsive to certain colors. A final color image is obtained by a digital image processing circuitry that performs pixel registration process with reference to the gray intensity image so that a true color image with true resolution is obtained therefrom.

31 Claims, 9 Drawing Sheets

DIGITAL CAMERAS USING MULTIPLE SENSORS WITH MULTIPLE LENSES

BACKGROUND OF THE INVENTION

1. Field of the Invention

The present invention generally relates to digital cameras and more particularly relates to digital color cameras that use four sensors, three for the tricolor sensing and the fourth for full-color sensing to improve the qualities of digital images therefrom.

2. Description of the Related Art

Digital photography is one of the most exciting technologies to emerge during the twentieth century. With the appropriate hardware and software (and a little knowledge), anyone can put the principles of digital photography to work. Digital cameras are on the cutting edge of digital photography. Recent product introductions, technological advancements, and price cuts, along with the emergence of email and the World Wide Web, have helped make digital cameras the hottest new category of consumer electronics products.

Digital cameras, however, do not work in the way as the traditional film cameras do. In fact, they are more closely related to computer scanners, copiers, or fax machines. Most digital cameras use an image sensor or photosensitive device, such as charged-coupled device (CCD) or Complementary Metal-Oxide Semiconductor (CMOS) to sense a scene. The photosensitive device reacts to light reflected from the scene and can translate the strength of that reaction into a numeric equivalent. By passing light through red, green, and blue filters, for example, the reaction can be gauged for each separate color spectrum. When the readings are combined and evaluated via software, the camera can determine the specific color of each segment of the picture. Because the image is actually a collection of numeric data, it can easily be downloaded into a computer and manipulated for more artistic effects.

Nevertheless, there are many cases in which digital cameras simply could not be used due to the limited resolutions from today's digital cameras. Film-based photographs have immeasurably higher resolutions than digital cameras. The comparison magnitude may be somewhere millions of pixels versus tens thousands of pixels in the digital cameras. Although, it is theoretically possible to design a photosensitive chip with multimillion of pixels, the cost of such chip would be a forbidden number and may consequently drag the digital cameras out of the consumer market.

Figure 1:
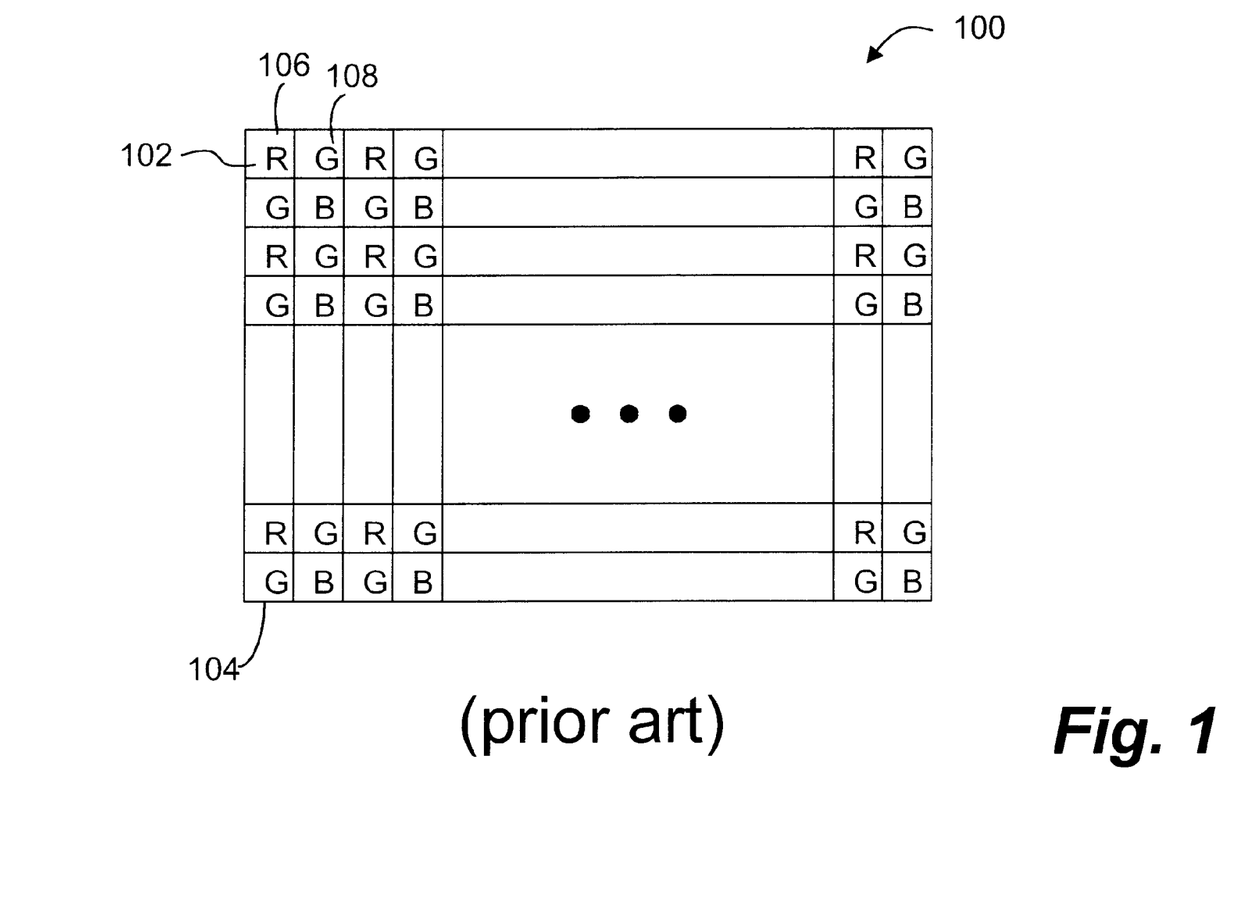
FIG. 1 shows a typical image sensor used in existing digital cameras.

FIG. 1 shows a typical image sensor or photosensitive chip 100 used in digital cameras. Photosensitive chip 100 comprises a plurality of photocells arranged in an array. A mosaic of selectively transmissive filters is superimposed in registration with each of the photocells so that a first, second and third selective group of photocells are made to sense the red, green and blue range of the visible spectrum, respectively. The number of the photocells in photosensitive chip 100 typically determines the resolutions of digital images resulting therefrom. The horizontal resolution is by the number of the photocells in a row 102 and the vertical resolution is by the number of the photocells in a column 104. Because of the alternating positions of the designated photocells, for example, 106 for red photocells and 108 for green photocells, the actual resolutions for a color image have been significantly reduced.

To have color images with higher resolutions, the number of photocells in a sensor must be increased. The actual design and manufacturing cost for a higher resolution sensor, however, would be evaluated at many magnitudes of the lower resolution sensors. Therefore there is a great need for a generic solution that makes digital cameras capable of producing high resolution images without enormously incurring the cost of photosensitive chips with multimillion photocells.

A second noticeable quality between digital cameras and film-based cameras is the dynamic range. Films have the necessary chemical pigments to make colors much more vivid and more adaptive to light conditions than current digital cameras can do. This is largely due to the limited pixel depth the current digital cameras could produce and the limited sensitivity of the photocells in the image sensor. There is thus a further need for digital cameras that produce better colors and details in a greater range.

There are many other quality factors that limit the popularity of digital cameras although it is well understood that the digital cameras are the much preferred image acquisition means. Solutions that fundamentally improve the image qualities without incurring substantial cost are always welcome and being seriously and continuously sought.

SUMMARY OF THE INVENTION

Recent product introductions, technological advancements, and price cuts, along with the emergence of email and the World Wide Web, have helped make digital cameras the hottest new category of consumer electronics products. But the image qualities, noticeably the image resolutions and color dynamic ranges, have limited the popularity of digital cameras among consumers. Under the constraints of improving image qualities without incurring substantial costs to the digital cameras, the present invention discloses improved digital cameras that use multiple image sensors with multiple lenses.

The present invention has been made in consideration of the above described problems and needs and has particular applications to digital cameras that are demanded to produce digital images of high qualities. According to one aspect of the present invention, an improved digital camera uses four image sensors, each having its own lens, of which three image sensors are made responsive to the three primary colors and the fourth one made responsive to all intensity information. Using a set of digital image processes embedded in a digital signal processing chip, images from the three color image sensors are processed with reference to the image from the black-and-white image sensor and subsequently produce high quality and film-like true color digital images.

With the unique configuration, there are many obvious benefits and advantages. First, the resolutions of the image sensors are fully used. Second each of the image sensors is only responsible for one color; thereby the expensive process of coating a mosaic of selectively transmissive filters superimposed in pixel-based registration on one image sensor is eliminated and subsequently no micro-lenses process is needed. Third, the image from the black-and-white image sensor captures all information including details that the three color image sensors may have missed. Further, because the resolutions of the image sensors are fully used, for the same resolution of color images, the image sensors would relatively have smaller number of pixels, which typically leads to high yield, higher sensitivity, less cross-talking, and lower clocking rate. Besides, the size of the image sensors could be smaller, resulting in smaller optical lenses.

According to one embodiment, the present invention is an improved digital camera comprising:

four image sensors, closely positioned with respect to a common plane, four lenses, each mounted in front of one of the four image sensors;

first three of the four image sensors being respectively sensitive to three different regions of visible color spectrum; a fourth sensor of the four image sensors being sensitive to a full region of the visible color spectrum; the full region including the three different regions in the visible color spectrum;

the four image sensors producing, independently and respectively, four intensity images when being exposed to an imaging target, first three images of the four intensity images respectively from the first three of the four image sensors and a fourth image of the four intensity images from the fourth sensor of the four image sensors;

an analog-to-digital converting circuitry coupled to the four image sensors and digitizing the four intensity images to produce four digital images; first three of the four digital images corresponding to the first three images and a fourth digital image of the four digital images corresponding to the fourth image of the four intensity images;

an image memory, coupled to the analog-to-digital converting circuitry, for storing the four digital images; and a digital image processing circuitry coupled to the image memory and receiving the four digital images, producing a color image of the imaging target from the four digital images.

According to one embodiment, the present invention is a method for producing digital images of high qualities, the method comprising:

obtaining three scalar images from three image sensors closely positioned in a common plane with reference to an image target;

obtaining a gray intensity image from a fourth image sensor, the fourth image sensor closely positioned in the common plane with the three image sensors;

digitizing the three scalar intensity images and the gray intensity image to produce three scalar digital images and a gray digital image;

buffering the three scalar digital images and the gray digital image in an image memory; and producing a color image from the three scalar digital images processed in conjunction with the gray digital image.

Objects and benefits, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

In the following detailed description of the present invention, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well known methods, procedures, components, and circuitry have not been described in detail to avoid unnecessarily obscuring aspects of the present invention.

Figure 2:
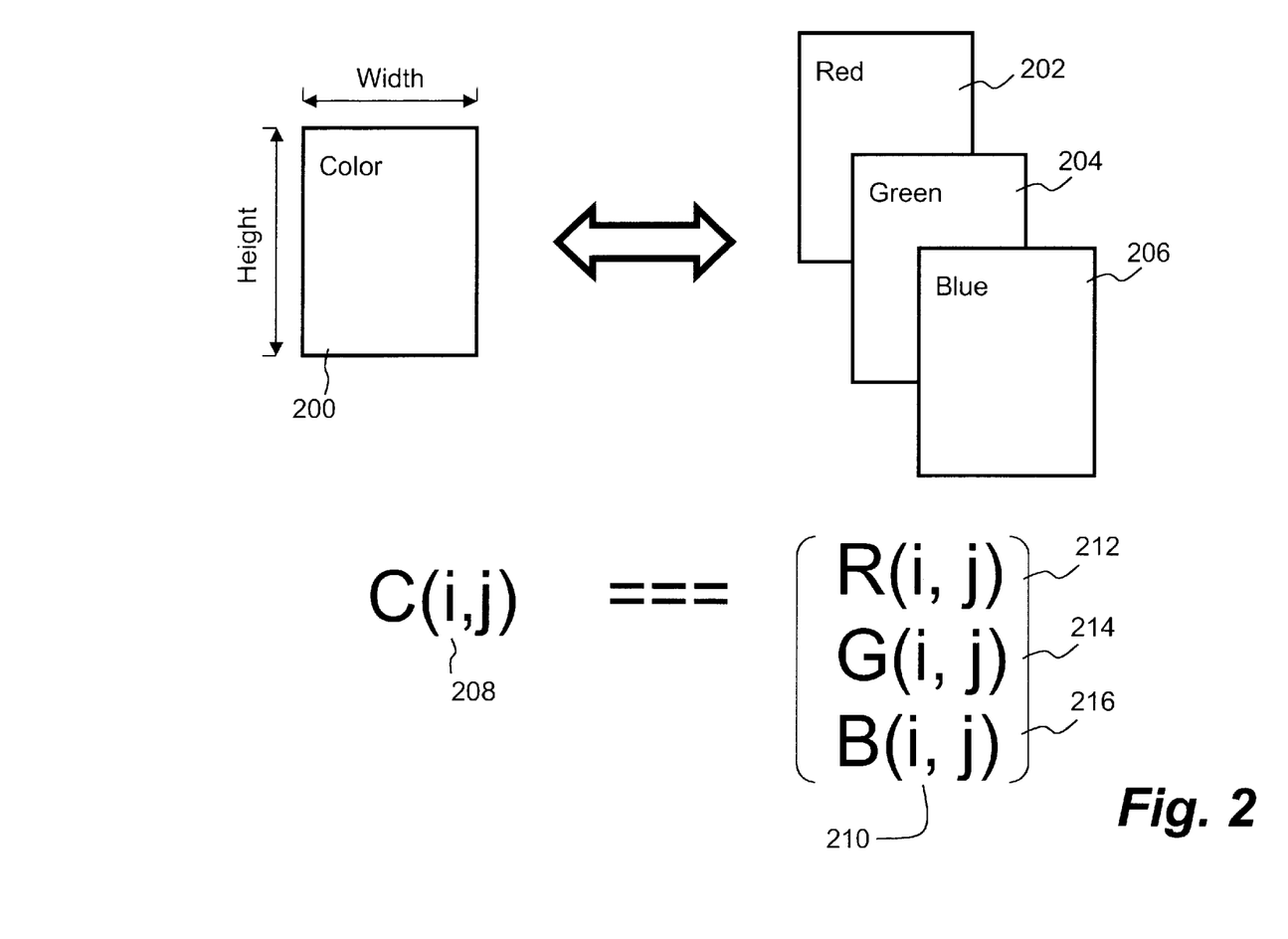
FIG. 2 illustrates a representation of a color image as a vector image comprising three scalar images, each from a distinct colored sensor.

Referring now to the drawings, in which like numerals refer to like parts throughout the several views. FIG. 2 depicts a representation of a color image 200. From the human color vision theory, it is known three primary colors are sufficient enough to represent all colors visible by human eyes. Of all possible three primary colors, red (R), green (G) and blue (B) are the most popular ones that are used to reproduce colors. Televisions, for example, use three component signals R, G and B to display most of the visible colors. Similarly to represent a color scene or object, three images in red, green, and blue are generally sufficient to reproduce the original colors of the scene or object. Hence color image 200 is represented by a red, green and blue image 202, 204 and 206.

From a mathematical perspective, color image C 200 may be referred to as a vector image, because each pixel at coordinates (i,j), expressed as C(i,j) 208, in the color image is a vector 210 that includes three scalar values R(i,j) 212, G(i,j) 214 and B(i,j) 216. In order words, obtaining a color image is equivalent to obtaining three scalar images, such as 202, 204 and 206. This principle has been used in professional video camera recorders in which a prism is often used to split an incoming reflected light from a scene into three distinct lights, each banded by a distinct region in the visible light spectrum. For example, an incoming reflected light is split to red, green and blue lights, namely the red light covers the red portion in the light spectrum, the green light covers the green portion in the light spectrum and the blue covers the blue portion in the light spectrum.

Figure 3:
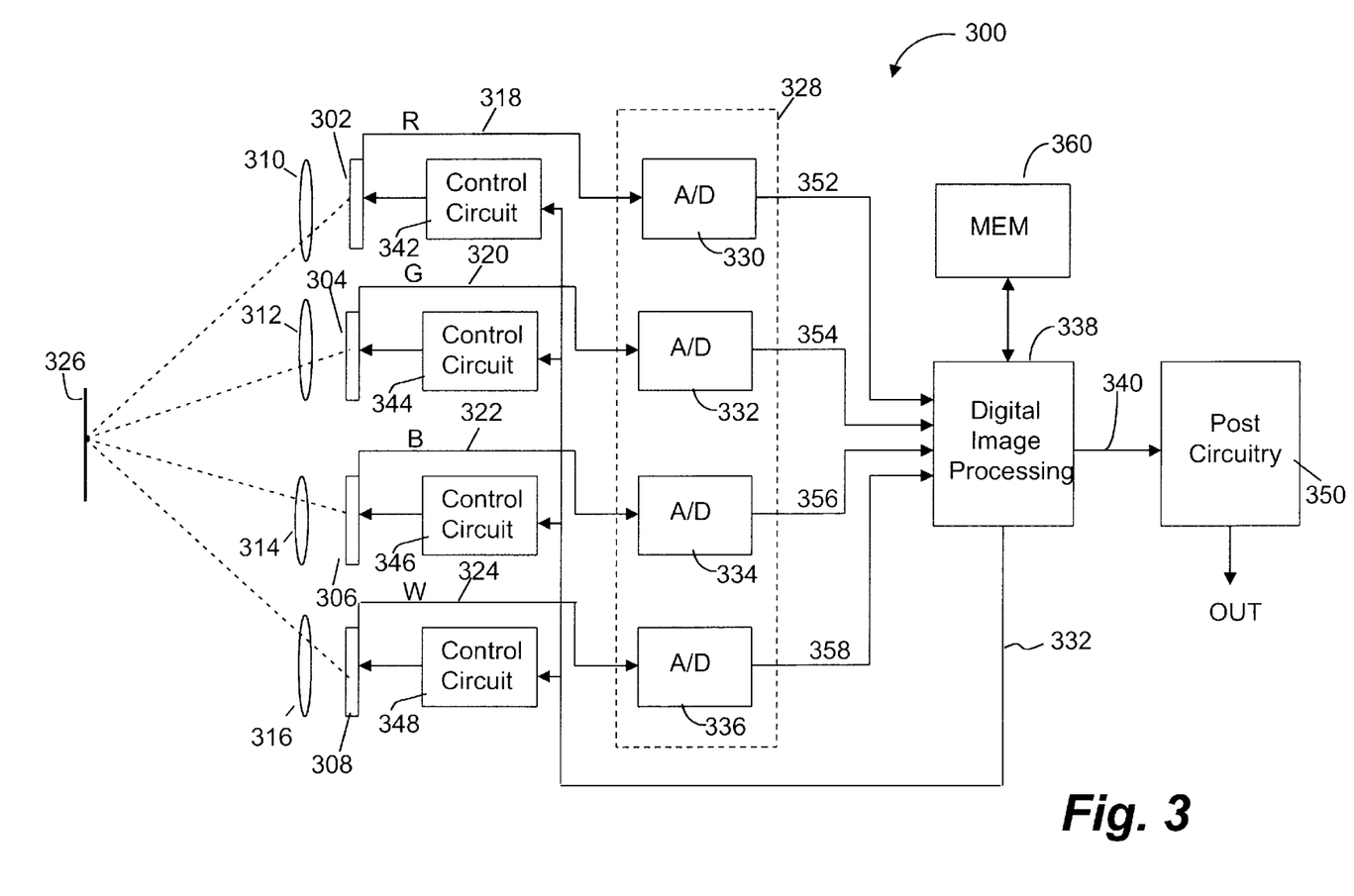
FIG. 3 shows a block diagram of an improved digital camera employing multiple lenses and sensors according to one embodiment of the present invention.

FIG. 3 shows a block diagram of an improved digital camera 300 employing multiple lens and sensors according to one embodiment of the present invention. Fundamentally and distinctly different from existing digital cameras, improved digital camera 300 uses four identical image sensors 302, 404, 306, and 308. Preferably, the image sensors are Complementary Metal-Oxide Semiconductor (CMOS) type. It should be noted that the present invention can be equally applied to Charged-Coupled Device (CCD) type image sensors as well.

One of the distinctions of the present inventions from prior arts is that the image sensors used herein are monochromatic, namely none of the image sensors are coated with a mosaic of selectively transmissive filters in pixel-based registration. Practically, using monochromatic image sensors rather than a color image sensor (which is coated with the selectively transmissive filters) has a lot of advantages. As described above, one of the obvious ones is the full use of the sensor resolutions.

Each of image sensors 302, 304, 306, and 308 is integrated respectively with a uniform transmissive filter, not shown explicitly in the figure, referred to as a color filter herein. To be more specific, if output 318 of image sensor 302 is designated for a red signal, the color filter is basically a red filter only transmitting red portion of target 326. Similarly the color filters for image sensors 304 and 306 are a green filter and a blue filter, respectively. It should be pointed out that red, green and blue filters in the present example are preferable, but may be integrated into a lens. That means that lenses 310, 312 and 314 are colored accordingly according to another embodiment. Further other choices of three primary colors will work the same as more explained below.

The fourth image sensor 308 is not specifically coated with a color filter. According to one embodiment, fourth image sensor 308 is integrated with filter 316 that is full transparent, allowing all components of visible light to pass through. In other words, there may not need any filter in front of image sensor 208 according to one aspect of the present invention. Because some image sensors like CCD types tend to have high sensitivity in red portion or beyond in the light spectrum, potentially decreasing image quality. It is preferable to have a proper light (band) filter that obstructs anything beyond the visible light spectrum (430 nm~680 nm).

Output signals from image sensors 302, 304, 306, and 308 are respectively sent to Analog-to-Digital (A/D) circuitry 328 that digitizes the output signals respectively. According to one embodiment, A/D converter 328 comprises four individual (channel) A/D converters 330, 332, 334 and 336; each coupled to one of the four image sensors respectively. As such, sensed images of target 326 from image sensors 302, 304, 306, and 308 can be digitized in parallel, yielding high signal throughput rates. Further, each of A/D converters 330, 332, 334 and 336 may be integrated directly with one corresponding image sensor, so that the output of the image sensor is a digital image.

Alternatively, output signals from image sensors 302, 304, 306, and 308 may respectively sent to Analog-to-Digital (A/D) circuitry 328 that digitizes the output signals independently and sequentially if A/D circuitry 328 is a standalone and separate A/D converter.

Figure 4A:
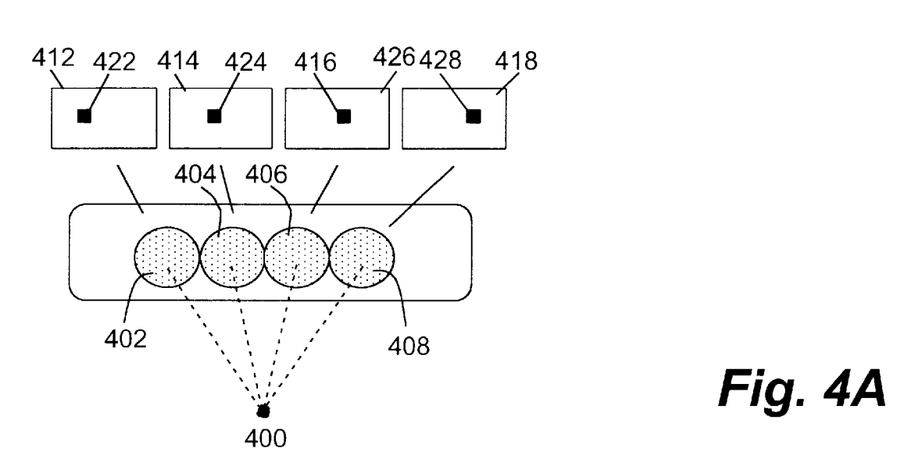
FIGS. 4A and 4B illustrate two possible spatial arrangements of four lenses used in the improved digital camera of FIG. 3.

Nevertheless outputs from A/D circuitry 328 or A/D converters 330, 332, 334 and 336 are four intensity images 352, 354, 356 and 358 that are preferably stored in image memory 360. It should be noted, however, these four intensity images 352, 354, 356 and 358 are not the scalar images of the color image of target 326 from the same perspective. FIG. 4A illustrates an arrangement of four lenses 402, 404, 406 and 408. Because four image sensors 302, 304, 306, and 308 of FIG. 3 are independently exposed to a target, for simplicity, four lenses 402, 404, 406 and 408 may be also viewed as four colored image sensors, namely four monochromatic image sensors are each coated with a distinct color filter. For example, 402 is an image sensor with a red filter thereon, 404 is an image sensor with a green filter thereon, 406 an image sensor with a blue filter thereon and 408 an image sensor with a band filter thereon. Image sensors 402, 404, 406 and 408 results in respectively four intensity images 412, 414, 416 and 418 when exposed to target 400 that is simply assumed to be a point. Hence, four intensity images 412, 414, 416 and 418 each has a pixel or a small group of pixels 422, 424, 426 and 428 representing target 400. Because of the different spatial positions of image sensors 402, 404, 406 and 408, pixels 422, 424, 426 and 428 do not register to a common point as respectively illustrated in four intensity images 412, 414, 416 and 418. Therefore four intensity images 412, 414, 416 and 418 can not be simply combined to form a color image of target 400.

Figure 4B:
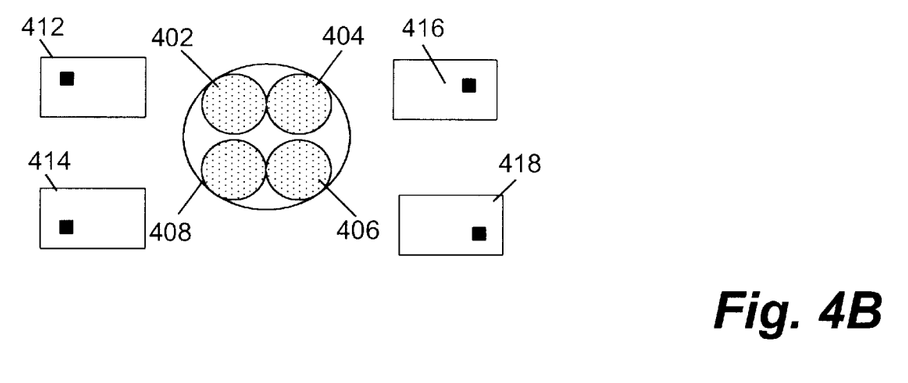

FIG. 4B shows another arrangement of four lenses 402, 404, 406 and 408 in a regular camera lens opening 410 so that the exterior appearance of a digital camera with multiple sensors and multiple lenses may look the same as a regular film camera. Regardless of other possible arrangements of image sensors behind four lenses 402, 404, 406 and 408, it can be appreciated to those skilled in the art that four images 412, 414, 416 and 418, resulting respectively from four lenses 402, 404, 406 and 408 will have to be registered before forming a color image therefrom.

Returning now to FIG. 3, there is a digital image processing circuitry 330 that performs many functions as described below.

One of the functions that digital image processing circuitry 330 performs is to control the operations of image sensors 302, 304, 306 and 308. Four independent feedback signals 332 are generated in circuitry 330 and determined from four digital image 352, 354, 356 and 358 resulting respectively from image sensors 302, 304, 306 and 308. Feedback signals 332 are then used respectively to control each of image sensors 302, 304, 306 and 308. For example, if digital image 354 from green image sensor 304 tends to be saturated, technically image sensor 304 should be less exposed. In digital image processing circuitry 330, digital image 354 is first analyzed, from which a corresponding feedback signal can be generated to shorten the exposure time of image sensor 304.

Given an intensity image, there are many ways to determine if the given image is saturated due to an overexposure. One of the available ways is to determine from a histogram of the given image, which is explained in great detail in "Digital Image Processing" by Rafael C. Gonzalez from Addison-Wesley Publisher. Large population concentrated on the high end of the histogram is an indication of saturation. Thus a control signal to reduce a predefined exposure time can be generated. Upon receiving the control signal, the control circuit acts accordingly. To be more specific, control circuits 342, 344, 346 and 348 receive respectively the control signals 332, each generated with respect to a corresponding histogram in digital image processing circuitry 338 and independently and respectively control image sensors 302, 304, 306 and 308. It is understood to those skilled in the art that there are many other causes that may need to control image sensors 302, 304, 306 and 308 independently, such as gain and offset controls. All necessary controls signals may be obtained from digital image processing circuitry 338 that operates on four digital image 352, 354, 356 and 358 respectively and independently resulting from image sensors 302, 304, 306 and 308.

Hence, one of the features in the present invention using four image sensors with four color filters is the independent control of each of the image sensors. This is not possible or could be complicated procedure in a single sensor coated with a mosaic of selective transmissive filters. As will be appreciated below, there are many other features in the present invention including high sensitivities, high dynamic ranges, achievement of true colors and increased SNR (signal-to-noise ratio).

For completeness, along with digital image processing circuitry 338, post circuitry 350 includes all necessary circuits to further process vector or color image 340. It is understood to those skilled in the art that some of the functions performed may include image compression in a conventional format such as JPEG and necessary I/O functions so that color images generated by digital camera 300 may be downloaded to other computing devices for further artistic editing/processing and subsequently for printing on glossy paper or publication on the Internet or World Wide Web.

In the above description of FIG. 3, it is inherently implied that image sensors 302, 304, 306 and 308 are identical. It is true when the primary colors are red, green and blue. However, those skilled in the art will understand that image sensors 302, 304, 306 and 308 being identical is not the requirement to practice the present invention. For example, image sensors 302, 304 and 306 are integrated with filters that may cause the image sensors to produce images signals similar to YIQ signals used in NTSC television system. In other words, if one of the three images from image sensors 302, 304 and 306 produces a luminance signal representing the light intensity of a color target 326 and the two images are the chrominance images, the resolutions of the chrominance images can be only one half of the luminance image, hence two of image sensors 302, 304 and 306 need to have one half of the resolutions of the third one. This is taking the advantage of the color sensitivity in human color visions.

Further it is also understood to those skilled in the art that the unique configuration of multiple sensors and multi lenses disclosed herein may be applied to black-and-white digital cameras in which there is only one monochromatic image sensor sensing only the intensity of an imaging target. Using an additional image sensor, such as image sensor 308 in FIG. 3 can help to modify image qualities of the original image from the monochromatic image sensor. The following description is based on the embodiment illustrated in FIG. 3, those skilled in the art can appreciate that the description is equally applied to the black-and-white digital cameras.

Figure 5:
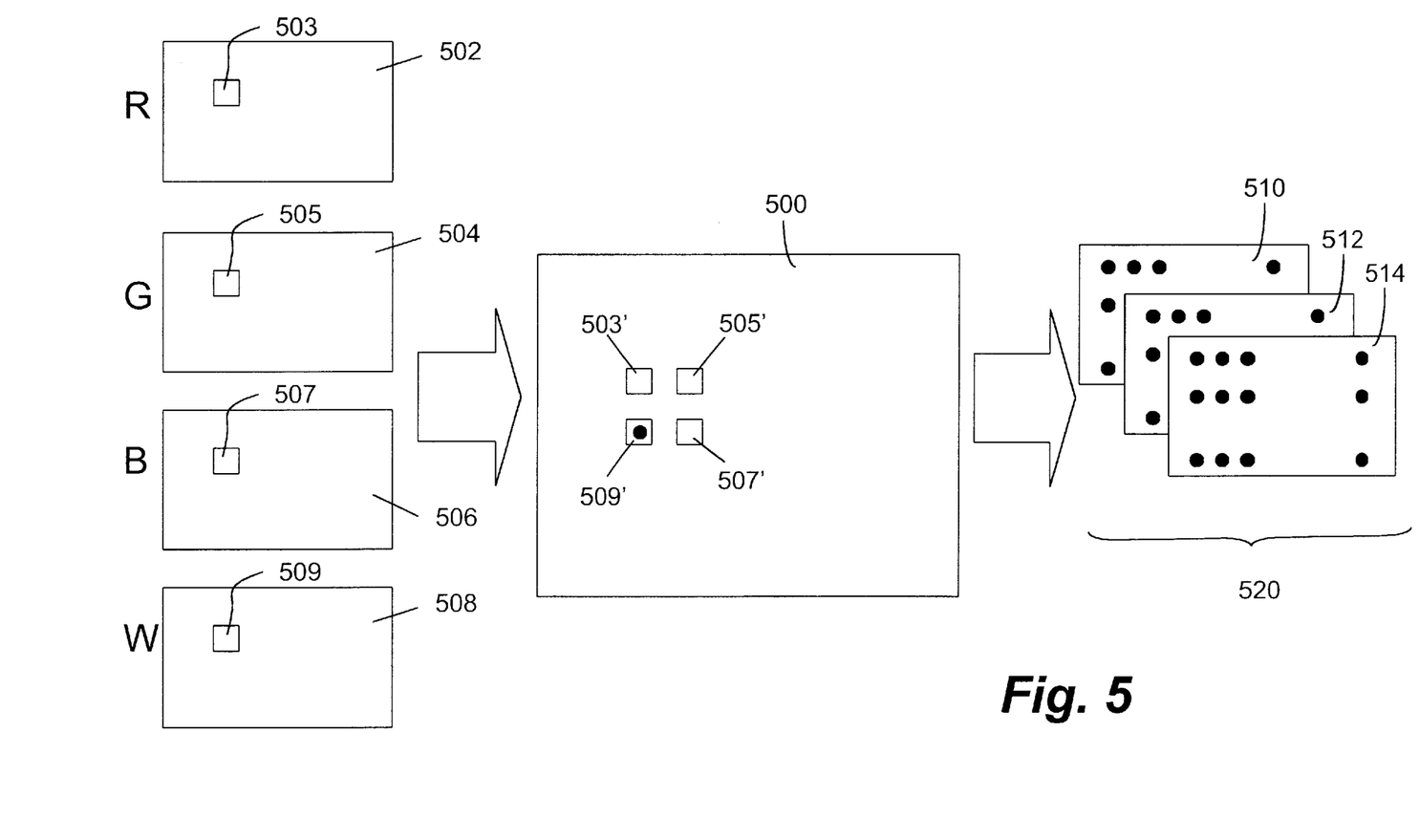
FIG. 5 illustrates a virtual color image formed by combining four intensity images stored in image memories.

Referring to FIG. 5, there is illustrated a virtual color image 500 formed by combining four intensity images 502, 504, 506 and 508. From virtual color image 500, a color or vector image 520 can be derived. Four intensity images 502, 504, 506 and 508 correspond respectively to four intensity images from four image sensors 302, 304, 306 and 308 of FIG. 3. As the name indicates, virtual color image 500 is not actually formed to occupy an image memory but is for illustrative purpose. Since four intensity images 502, 504, 506 and 508 are typically kept in a memory such as 360 of FIG. 3 after being digitized, color image 520 can be derived from virtual color image 500 that utilizes all data in intensity images 502, 504, 506 and 508.

Given reference coordinates, intensity images 502, 504 and 506 are respectively processed to be registered with intensity image 508. In other words, pixels 503', 505' and 507' will be mapped to coordinates 509', all pixel values in scalar images 510, 512 and 514 are derived from other pixel values in the image.

To be more specific, pixels in four intensity images 502, 504, 506 and 508 from image sensors, even very closed positioned, are not in registration. That means that four respective pixels at the same coordinates in four intensity images 502, 504, 506 and 508 do not correspond to the same spatial point in a scene. Therefore, color image 510 must be derived from four intensity images 502, 504, 506 and 508.

Figure 6A:
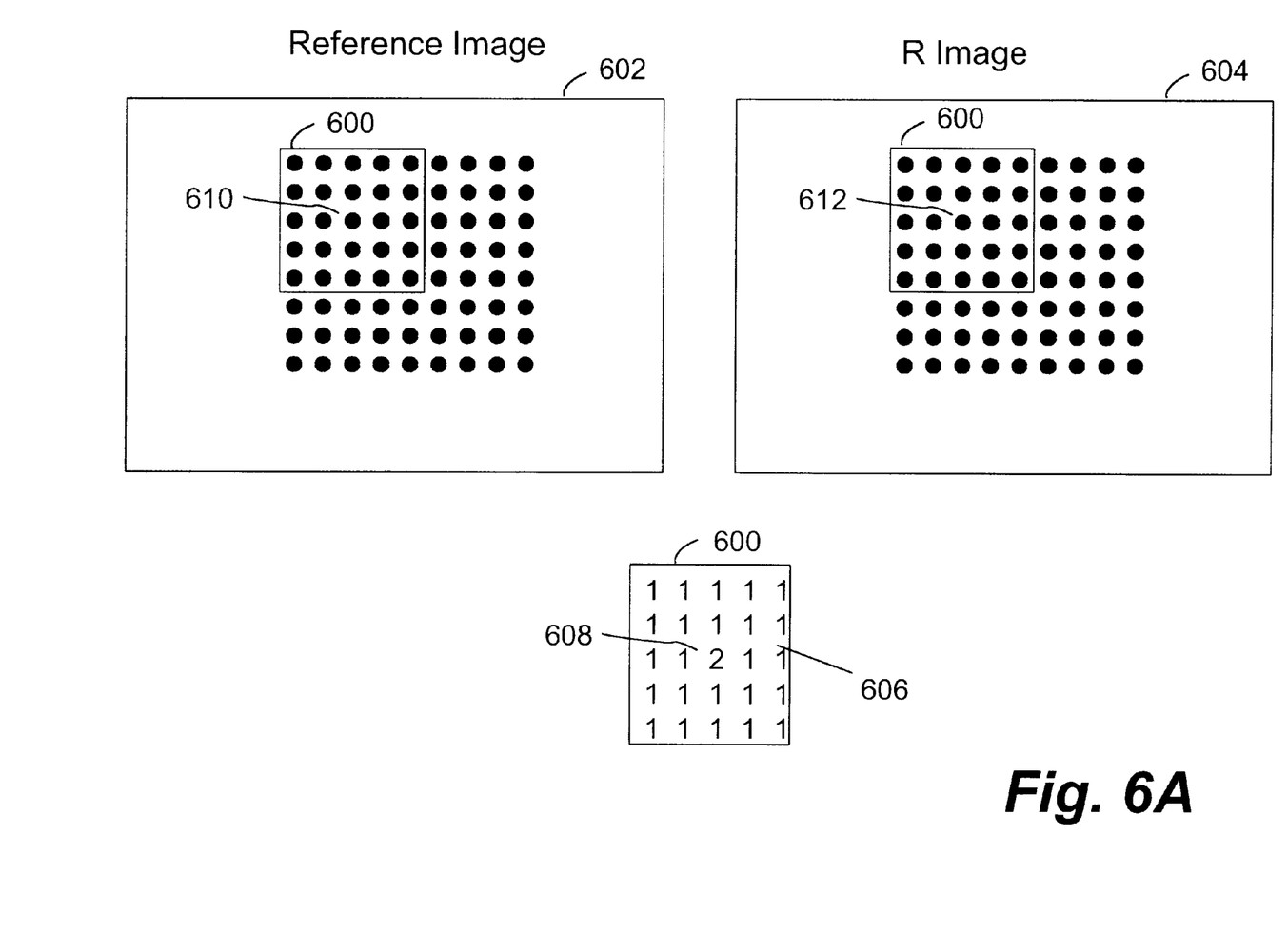
FIG. 6A illustrates a red image being processed for pixel registration with respect to a reference image.

According to one embodiment, intensity image 508, referred to as B/W image herein, is used as a reference image, which means vector pixels in color image 500 are registered with scalar pixels in B/W image 508 as shown in virtual color image 500. FIG. 6 shows a registration process according to one embodiment of the present invention. A sliding block or window 600 is superimposed respectively over a reference image 602 and a red (R) image 604. It should be noted that reference image 602 corresponds to B/W image 508 and R image 604 corresponds to red image 502 of FIG. 5 provided the registration for red image 502 is proceeded first. The size of window 600 is preferably a square, for example; 3 by 3, 5 by 5 or 7 by 7. Because window 600 is used to determine a pair of corresponding pixels in both reference image 602 and R image 604, the center coefficient 608 is normally weighted heavier than the rest of the surrounding coefficients 606.

For all pixels surrounded by window 600, a set of statistic characteristics for the surrounded pixels are computed, such as a mean value and first or second-order derivations. To be more specific, the set of statistic characteristics for the pixels surrounded by window 600 in reference image 602 is first determined. Then a corresponding set of statistic characteristics for the pixels surrounded by window 600 in R image 604 is calculated. As described before, image sensors are closely positioned, the spatial position offset is normally small. Therefore window 600 does not have to be large and the corresponding set of statistic characteristics for the pixels surrounded by window 600 in R image 604 shall be close to that for the pixels surrounded by window 600 in reference image 602.

Figure 6B:
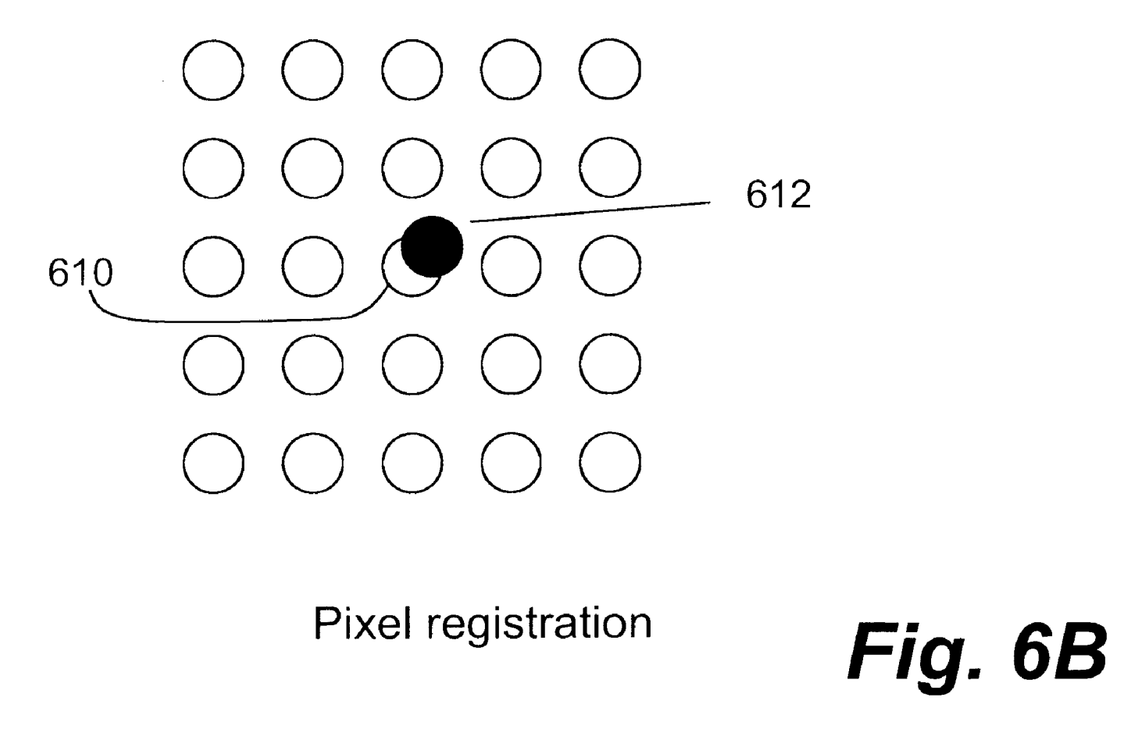
FIG. 6B illustrates a pixel being adjusted to the reference coordinates to minimize the weighted characteristic difference between two windowed groups of pixels.

Given image 602 being the reference, an adjustment of the center coordinates by window 600 can be derived by matching the statistic characteristics for the pixels surrounded by window 600 in reference to image 602. For example, FIG. 6B shows that shifting original coordinates 612 to referenced coordinates 610 will minimize the difference between the two sets of statistic characteristics just computed from reference image 602 and R image 604. With the registered coordinates, it is understood that the pixel value thereof can be derived from the surrounding pixel values.

It can be appreciated that the same pixel registration process may be proceeded on each pixel in R image 602 or one block by one block (block-based). The pixel registration process based on each pixel is very computationally extensive and therefore preferably carried in predefined blocks. Pixels in registered blocks are then further registered on pixel bases using linear interpolation that is known in mathematical books.

After the registration process is respectively carried out for each of the three color intensity images, namely images 502, 504 and 506, a number of reference values are obtained. Of those, a motion vector comprising the pixel shifting information tells how a color image is shifted due to the spatial position offset of the image sensors. Another parameter, regional color information, helping to verify if a registered pixel is correct, can be derived from the registered pixels in the three color intensity images. Because of strong color correlation in a color image, one color pixel shall not be suddenly different from the neighboring pixels. Therefore the regional color information can help to verify if a derived registered color pixel is correct or not. Preferably, a verification process is provided to verify if the derived pixels are correct with reference to the reference values.

Figure 7:
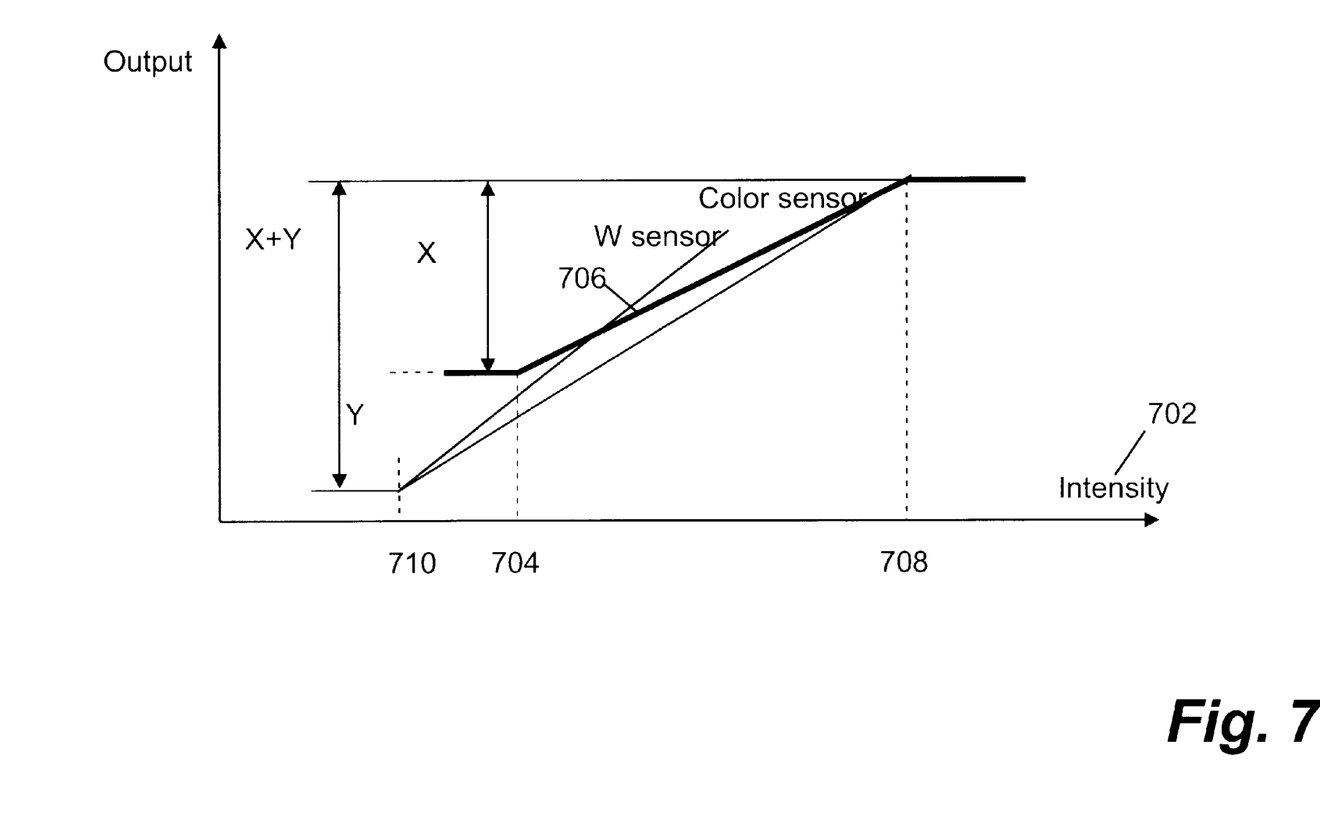
FIG. 7 demonstrates the dynamic ranges of images from color image sensors are expanded with reference to an intensity image from a B/W image sensor.

FIG. 7 shows a process that B/W intensity image 508 is used to increase the dynamic range of one of intensity images 502, 504 and 506. It is well known that colors become less significant when a light intensity is low, i.e. light is dim. Therefore, till intensity 702 reaches a certain level 704, a color sensor, i.e. one of sensors 302, 304 and 306 of FIG. 3, starts to output meaningful signals 706. As intensity 702 increases progressively to another level (value) 708, the color sensor starts saturated, namely the outputs stay the same regardless how high level 708 goes. So the dynamic ranges of the color sensor is limited. Those who have used digital cameras may have experienced that an image looks dull when the light is not sufficient. The fade appearance is due to the limited dynamic range partially caused by intensity (threshold) 704.

B/W sensor 308, however, is not coated with any color filters and is sensitive to low intensity down to level 710. In other words, the dynamic range of sensor 308 is different and typically larger than that of sensors 302, 304 and 306. One of the key features of the present multiple sensors is to use the intensity image from B/W sensor 308 to expand the dynamic ranges of images from sensors 302, 304 and 306 so as to increase overall dynamic range of the resultant color images.

FIG. 7 shows that the color sensor has a dynamic range of X levels. One simple approach to expand the dynamic range of the color sensor is to append those signals missed by the threshold 704 of the color sensor to signals from the color sensor. As shown in the figure, the extra dynamic range Y levels from the W sensor is what the color sensor can not sense. Therefore adding the portion (Y levels) to the images from the color sensor will increase the dynamic range from X levels to (X+Y) levels. If the same process is applied to images from other two sensors, the resultant color image will reveal details in those area that otherwise could not be shown.

According to another embodiment in which the W sensor is not used, three images from three color sensors can compliment each other in the same way as described. This can be done as a result of three images from three independent sensors, each being separately controlled with different exposure time and other system parameters. Those skilled in the art can appreciate that images from a single image sensor with a single lens can be hardly enhanced for a larger dynamic range without sacrificing one end or the other of the dynamic range. With images independently from multiple sensors with multiple lenses, the complementary expansions of the respective dynamic ranges become possible.

Figure 8:
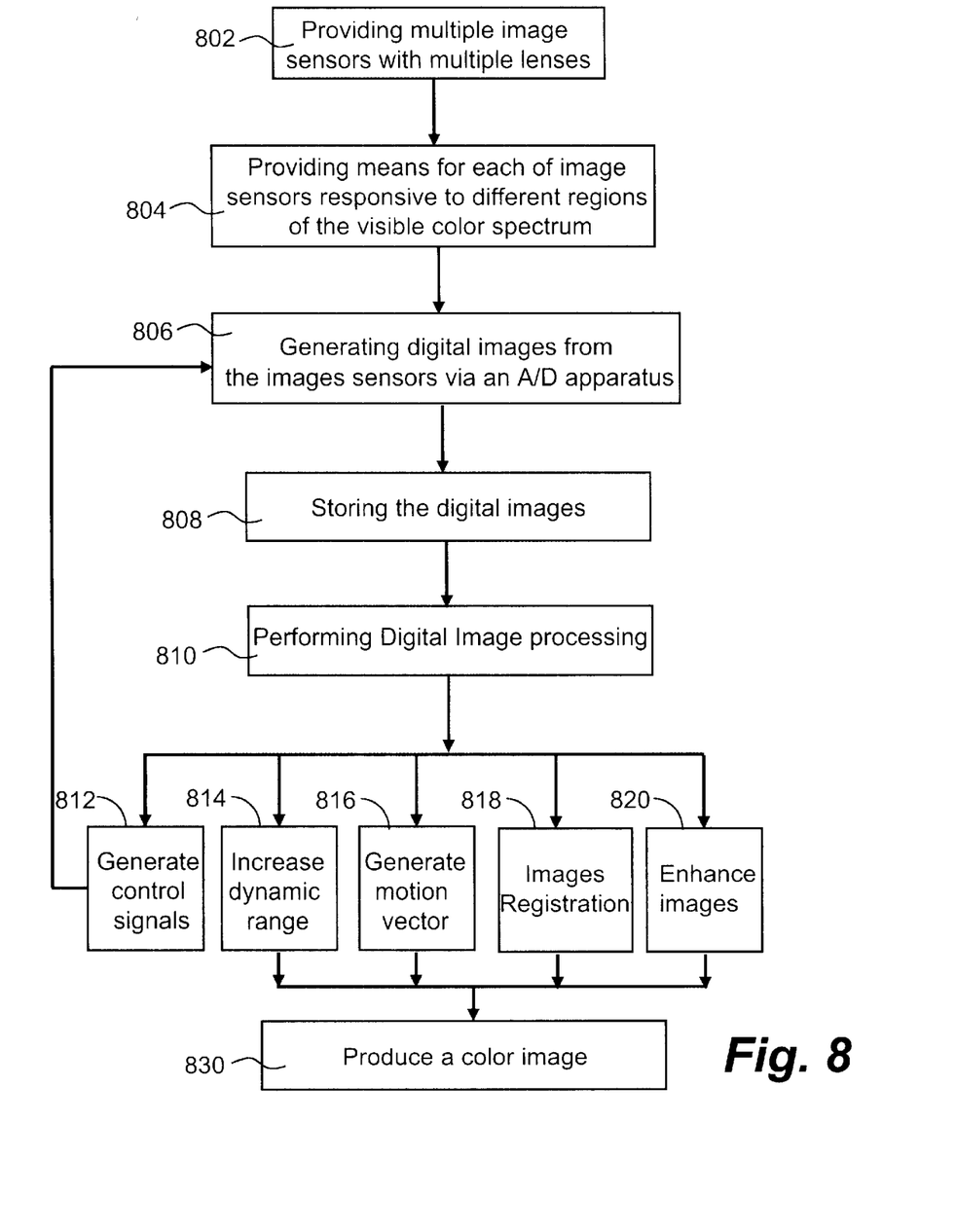
FIG. 8 shows a process flow diagram of the present invention according to one embodiment.

FIG. 8 shows a process flow diagram of present invention according to one embodiment and shall be understood in conjunction with FIG. 3. Different from existing digital cameras, the disclosed improved digital camera uses multiple sensors with multiple lenses at 802. In particular, one embodiment uses four identical image sensors, full resolutions of the images are fully used. At 804, each of the image sensors is made to be responsive to a certain color region of the visible color spectrum. Examples include the use of color filters coated upon the image sensors and colored lenses. What should be noted is that one of the image sensors can be made to be responsive to a full range of the visible color spectrum, which may include the use of a full transparent filter. With the configuration, each of the image sensors is respectively and independently controlled to expose to the same imaging target. It can be appreciated by those skilled in the art that the existing digital cameras using one image sensor would not be able to selectively control the operations of image pixel while each of the image sensors in the present invention can be controlled independently.

At 806, the images produced by the image sensors are digitized and then stored in image memories. With full access to the stored digital images in the image memories, a set of image processes implemented in a DSP chip perform a number of operations at 810 that include generating control signals at 812, increasing dynamic range of image signals at 814, and generating motion vector at 816 to help image registration process at 818. Further, with images of the same imaging target from the multiple sensors, it is possible to enhance images, such as noise removal and color correction at 820. More importantly, a true color image with true resolutions is derived from the enhanced images at 830.

What sets the present invention fundamentally apart from existing technologies is the use of the black-and-white intensity image from the image sensor with a full transparent filter or no filter at all. The B/W image sensor can capture full information including details that may be missed by those color image sensors. The intensity image from the B/W image sensor is then repeatedly used in the image processing processes in the DSP chip that subsequently produces a high quality and film-like digital image.

The present invention has been described in sufficient detail with a certain degree of particularity. It is understood to those skilled in the art that the present disclosure of embodiments has been made by way of example only and that numerous changes in the arrangement and combination of parts as well as steps may be resorted without departing from the spirit and scope of the invention as claimed. Accordingly, the scope of the present invention is defined by the appended claims rather than the forgoing description of embodiments.

We claim:

1. An improved digital camera comprising:

a first and a second image sensor closely positioned with respect to a common plane, said second image sensor sensitive to a full region of visible color spectrum;

two lenses, each being mounted in front of one of said two image sensors;

said first image sensor producing a first image and said second image sensor producing a second image;

an analog-to-digital converting circuitry coupled to said first and said second image sensor and digitizing said first and said second intensity images to produce correspondingly a first digital image and a second digital image;

an image memory, coupled to said analog-to-digital converting circuitry, for storing said first digital image and said second digital image; and a digital image processor, coupled to said image memory and receiving said first digital image and said second digital image, producing a resultant digital image from said first digital image enhanced with said second digital image.

2. The improved digital camera as recited in claim 1, wherein said first image sensor sensitive to said full region of visible color spectrum.

3. The improved digital camera as recited in claim 1, wherein one of said two lenses is configured to allow said first image sensor sensitive to a selected range of said full region of visible color spectrum, and the other one of said two lenses is configured to allow said second image sensors sensitive to said full region of visible color spectrum.

4. The improved digital camera as recited in claim 1, wherein said analog-to-digital converting circuitry comprises two individual analog-to-digital converters, each integrated with one of said first and second image sensors so that said first and second digital images are digitized independently and in parallel to increase signal throughput rate.

5. The improved digital camera as recited in claim 1, wherein said digital image processor increases the dynamic range of said first digital image by incorporating a portion of said second digital image into said first digital image.

6. An improved digital camera comprising;
four image sensors, closely positioned with respect to a common plane,
four lenses, each mounted in front of one of the four image sensors;
first three of said four image sensors being respectively sensitive to three different regions of visible color spectrum, a fourth sensor of said four image sensors being sensitive to a full region of said visible color spectrum, said full region including said three different regions in said visible color spectrum;
said four image sensors producing, independently and respectively, four intensity images when being exposed to an imaging target, first three images of said four intensity images respectively from said first three of said four image sensors and a fourth image of said four intensity images from said fourth sensor of said four image sensors;
an analog-to-digital converting circuitry coupled to said four image sensors and digitizing said four intensity images to produce four digital images, first three of said four digital images corresponding to said first three images and a fourth digital image of said four digital images corresponding to said fourth image of said four intensity images;
an image memory, coupled to said analog-to-digital converting circuitry, for storing said four digital images; and
a digital image processing circuitry coupled to said image memory and receiving said four digital images, producing a color image of said imaging target from said four digital images.

7. The improved digital camera as recited in claim 6, wherein said first three of said four image sensors, each being coated with a different color filter responsive to one of said three different regions in said visible color spectrum.

8. The improved digital camera as recited in claim 7, wherein said different color filter is in one of the three primary colors and wherein said three different regions are respectively the three primary colors.

9. The improved digital camera as recited in claim 8, wherein the three primary colors are red, green and blue.

10. The improved digital camera as recited in claim 7, wherein said different color filter is in one of the three complementary colors and wherein said three different regions are respectively the three complementary colors.

11. The improved digital camera as recited in claim 10, wherein the three complementary colors are magenta, yellow and cyan.

12. The improved digital camera as recited in claim 6, wherein three of said four lenses are respectively in three primary colors.

13. The improved digital camera as recited in claim 12, wherein the three primary colors are red, green and blue.

14. The improved digital camera as recited in claim 6, wherein three of said four lenses are respectively in three complementary colors.

15. The improved digital camera as recited in claim 14, wherein the three complementary colors are magenta, yellow and cyan.

16. The improved digital camera as recited in claim 6, wherein said analog-to-digital converting circuitry comprising four independent analog-to-digital converters, each integrated with one of said four image sensors so that said four intensity images are digitized independently and in parallel to increase signal throughput rates.

17. The improved digital camera as recited in claim 6, wherein said digital image processing circuitry increases respectively and independently the dynamic range of said first three digital images by incorporating a portion of said fourth digital image into each of said first three digital images.

18. The improved digital camera as recited in claim 6, wherein said digital image processing circuitry produces four control signals, each controlling the exposure time of one of said four image sensors by analyzing respectively said four digital images.

19. The improved digital camera as recited in claim 18, wherein said digital image processing circuitry generating a histogram for each of said four digital images, each of said controls signals calculated from said histogram.

20. The improved digital camera as recited in claim 6, wherein said four image sensors are monochromatic and identical.

21. The improved digital camera as recited in claim 20, wherein said digital image processing circuitry calculates a set of statistic measurement within a moving window for each of said four digital images.

22. The improved digital camera as recited in claim 20, wherein said digital image processing circuitry further minimizes the difference of said statistic measurements between said fourth digital image and each of said first three digital images by moving center coordinates of said moving window in each of said first three digital images towards corresponding center coordinates of said moving window in said fourth digital image.

23. The improved digital camera as recited in claim 22, wherein said digital image processing circuitry further derives a motion vector when the difference of said statistic measurements between said fourth digital image and each of said first three digital images is minimized so that the spatial position offset among said four image sensors can be determined.

24. The improved digital camera as recited in claim 23, wherein said digital image processing circuitry registers each pixel in each of said first three digital images with reference to corresponding pixels in said fourth digital image.

25. The improved digital camera as recited in claim 24, wherein said digital image processing circuitry enhances each of said first three digital images by looking up said fourth digital image.

26. A method for generating color images of high quality in a digital camera, said method comprising:
obtaining three scalar images from three image sensors closely positioned in a common plane with reference to an image target;
obtaining a gray intensity image from a fourth image sensor, said fourth image sensor closely positioned in said common plane with said three image sensors;
digitizing said three scalar intensity images and said gray intensity image to produce three scalar digital images and a gray digital image;
buffering said three scalar digital images and said gray digital image in an image memory;

producing a color Image from said three scalar digital images processed in conjunction with said gray digital image; and wherein said three image sensors and said fourth image sensors are monochromatic and identical in resolution.

27. The method as recited in claim 26, wherein said three image sensors are made to be respectively responsive to three primary colors.

28. The method as recited in claim 27, wherein said three image sensors are respectively coated with filters of the three primary colors.

29. The method as recited in claim 27, wherein each of said three image sensors is mounted behind a lens.

30. The method as recited in claim 26, wherein said digitizing said three scalar intensity images and said gray intensity image comprises:

digitizing said three scalar intensity images and said gray intensity image in parallel and simultaneously by four individual A/D converts respectively integrated with said three image sensors and said fourth image sensor.

31. The method as recited in claim 26, wherein said producing a color image from said three scalar digital images processed in conjunction with said gray digital image comprises:

determining a set of reference statistic measurement in a windowed area of said gray digital image, said windowed area having referenced center coordinates;

determining a set of statistic measurement in a corresponding windowed area of each of said three scalar digital images;

minimizing the difference between said reference statistic measurement and said statistic measurement by moving center coordinates of said windowed area of each of said three scalar digital images towards said referenced center coordinates;

obtaining a motion vector to determine a spatial position offset between said gray digital image and each of three scalar digital images;

registering each pixels of three scalar digital images using said motion vector.

* * * * *